United States Patent [19]
Hurd et al.

[11] 3,794,393
[45] Feb. 26, 1974

[54] ROLLER BEARING ASSEMBLY

[75] Inventors: Charles B. Hurd, Aurora; Gerald W. Richmond, Montgomery; Leo E. Richmond; Earl F. Tidholm, both of Aurora, all of Ill.

[73] Assignee: Borg-Warner Corporation, Chicago, Ill.

[22] Filed: June 29, 1972

[21] Appl. No.: 267,306

[52] U.S. Cl. ............................................ 308/207
[51] Int. Cl. .......................................... F16c 33/00
[58] Field of Search ...... 308/194, 207, 214, 72, 236

[56] References Cited
UNITED STATES PATENTS
2,166,391   7/1939   Borland ............................ 308/236
872,397   12/1907   Wulff ................................ 308/207

*Primary Examiner*—Charles J. Myhre
*Assistant Examiner*—Frank Susko
*Attorney, Agent, or Firm*—Donald W. Banner et al.

[57] ABSTRACT

A housing with a self-aligning, sealed roller bearing, the bearing having an inner race and an outer race assembly with rollers therebetween. The bearing can be pre-lubricated and is capable of being re-lubricated. The outer race assembly has a continuous outer spherical surface mating with an interior spherical surface of the housing. The outer race assembly is of two pieces, one race being formed on a cylindrical member received by the other piece having the continuous outer spherical surface. The cylindrical member is held in position by various means which enable the manufacture to supply the customer with any pre-loading required for a particular installation.

7 Claims, 3 Drawing Figures under some conditions, by turning the operation 180°, a single piece outer race may be used.

ROLLER BEARING ASSEMBLY

BACKGROUND OF THE INVENTION

Housings, such as pillow and flange blocks with roller bearing inserts are well known in the art. There are basically two varieties of bearing assemblies, one is a fixed position bearing assembly and the other is known as a self-aligning bearing assembly. The fixed position bearing assembly is capable of handling only slight shaft misalignment, but is generally compact and has relatively few parts. The self-aligning bearing assembly is generally more complex, larger, and is constructed of a large number of parts. Usually, a self-aligning bearing assembly cannot be fitted to the space requirements of the fixed bearing assembly.

THE INVENTION

According to this invention, there is provided an improved roller bearing assembly comprising a housing such as a pillow block casting and a replaceable, sealed, pre-lubricated roller bearing, which is fully self-aligning. The construction is small, simple and of relatively few parts. The assembly is capable of replacing conventional fixed position assemblies now in commercial use, without occupying additional space. While the bearing is generally pre-lubricated, its construction permits it to be re-lubricated as required.

The pillow block comprises a casting having a pocket or cavity defined by an internally machined spherical surface which mates with an external spherical surface on the bearing, such that the bearing can move relative to the casting to provide the self-aligning feature of the assembly. The external spherical surface is provided on one or a first element of a two piece outer race assembly. The outer race assembly comprises the member with the outer spherical surface which is formed with a raceway or inner surface for theoretical line contact with one set of rollers and a cylindrical surface to receive a ring member having an inner surface forming the other raceway. The bearing comprises, in addition to the outer race assembly, an inner race, sets of tapered rollers, a roller retainer or cage for each set of rollers, means by which the assembly is retained as a unit, and lubricant seals at the ends of the unit. The assembly retaining means which may take several forms is associated with the first element of the outer race assembly and permits pre-loading of the assembly to the customers' specifications. An opening is provided for the introduction of lubricant whereby the unit may be factory lubricated and re-lubricated as required.

There are several types of pillow block castings which can be used. One type is provided with a loading slot through which the bearing is inserted. Another type is the split block casting constructed of a base and top, and divided through the bearing receiving zone. A third type of block casting is one in which an adaptor ring is used to retain the bearing in operating position. While any type of pillow block casting may be used to receive a bearing constructed according to the teachings herein, it must be remembered that the bearing is of such size to replace the fixed position assemblies; in other words, the pillow block casting is also compact.

The invention is also usable with flange blocks to form a bearing assembly; the same advantages are realized when so used.

THE DRAWINGS

DETAILED DESCRIPTION

Figure 1:
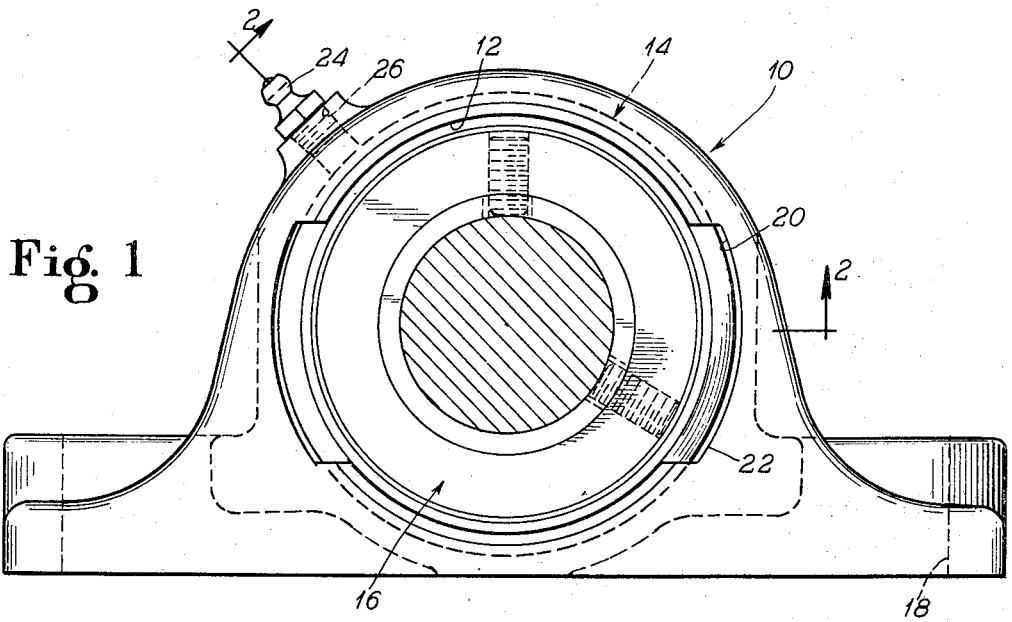
FIG. 1 is an elevation view of a typical pillow block with a bearing according to this invention.

In FIG. 1, there is shown a pillow block casting 10 having a pocket or cavity 12 defined by an internal spherical surface 14 for receiving a bearing 16. The center of the radius of the arc which generates the surface 14 is located at the geometric center of the assembly. The base of the casting 10 is provided with elongated openings 18 for receiving bolts (not shown) by which the block is mounted for lateral adjustment on a support.

The block 10 has a loading slot 20 for receiving the bearing 16. The loading slot has cylindrical ends 22 of a radius at least as large as the spherical radius of the bearing 16, and a width at least as wide as the outer race assembly of the bearing 16. The loading slot 20 extends from the center plane of the block axially to one open end of the bearing socket 12. The bearing 16 is inserted by turning it so that its axis is perpendicular to the axis of the block and the plane of the bearing. After inserting the bearing into the socket 12, it is turned to usable position. Removal of the bearing 16 requires reversal of these steps. A conventional grease fitting 24 is screwed into a tapped opening 26 in the casting to provide means whereby a lubricant can be introduced between the block and the bearing.

In some cases, the bearing is assembled after the outer race is loaded into the pillow block casting. Also, while the above describes assembly in a loading slot block casting, it is to be noted that the bearing is adaptable for use with the other types of block castings.

The bearing 16 comprises a cylindrical inner race 30, a two part outer race assembly 32, pairs of rollers 34, 36, and roller retaining members or cages 38.

The inner race 30 has an inside diameter 44 disposed to receive a shaft of substantially the same diameter, and an outside configuration comprising two conical raceways 46, 48, having axes which coincide with one another and also with the axis of the inside diameter. The raceways are disposed to receive the conical rollers 34A, 36A of the groups of rollers in theoretical line contact when operationally oriented. Extensions 50 of the inner race are slotted, as at 52, for receiving shaft locking means 54 by which the shaft is locked in position. While FIGS. 1 and 2 of the drawing illustrate a shaft locking means 54 at one end of the cartridge, it should be understood that in some instances, the inner race has two extensions 50, so that locking means 54 at both ends are required or can be used.

The outer race assembly 32 comprises a member 56 having the outer spherical surface 57 and a conical raceway 58 for theoretical line contact with one group of rollers. The member 56 has a cylindrical bore 60 to receive an adaptor ring 62 having an outer cylindrical surface 64 of a diameter to fit into the bore 60. The ring 62 is formed with a conical raceway 66 for theoretical line contact with the other roller bearing group. Various means may be used to retain the ring 62 and the member 56 in assembled relationship. Also, such means provides a convenient method for providing controlled end play and a method of preloading the assembly to a customer's specification. For example, the member 56 may be slotted at 68 to receive a split locking ring 70; various widths of locking rings may be used. The members may be threaded such that the ring 62 can be screwed into the member 56. The ring 62 and member 56 may be press fitted or even welded.

Sealing means 72 are positioned at the ends between the inner and outer races to prevent the escape of lubricant and to seal the bearing against the ingress of dirt or other foreign material. The sealing means is such to permit relative motion between the inner and outer races.

Figure 2:
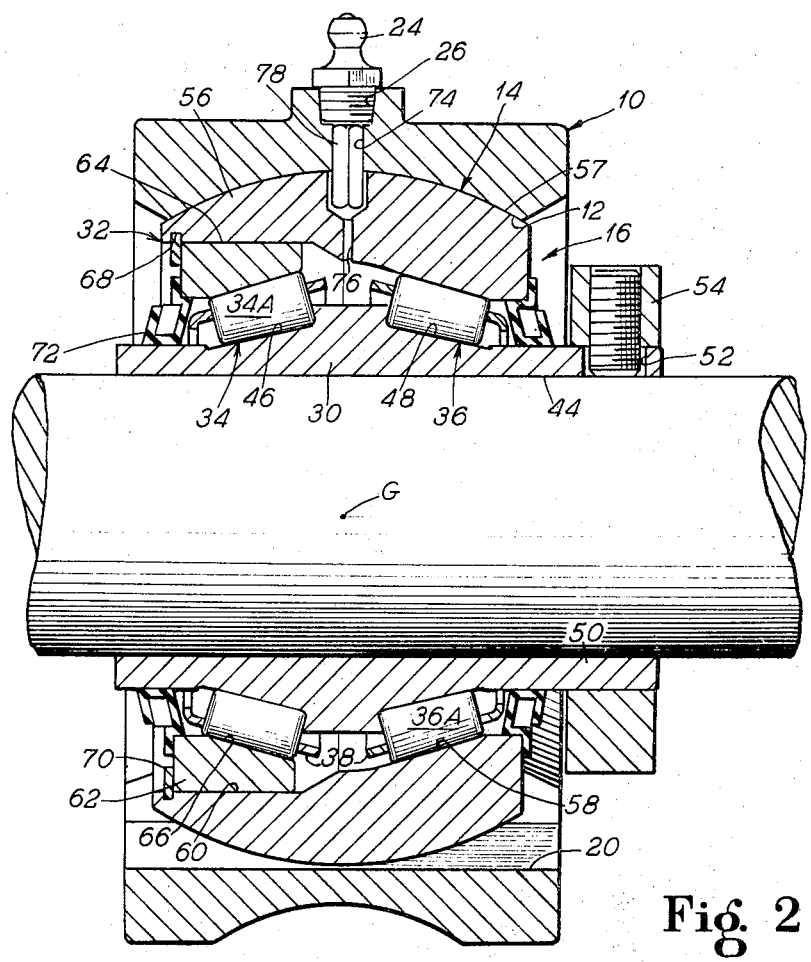
FIG. 2 is a sectional view taken on line 2—2 of FIG. 1.
Figure 3:
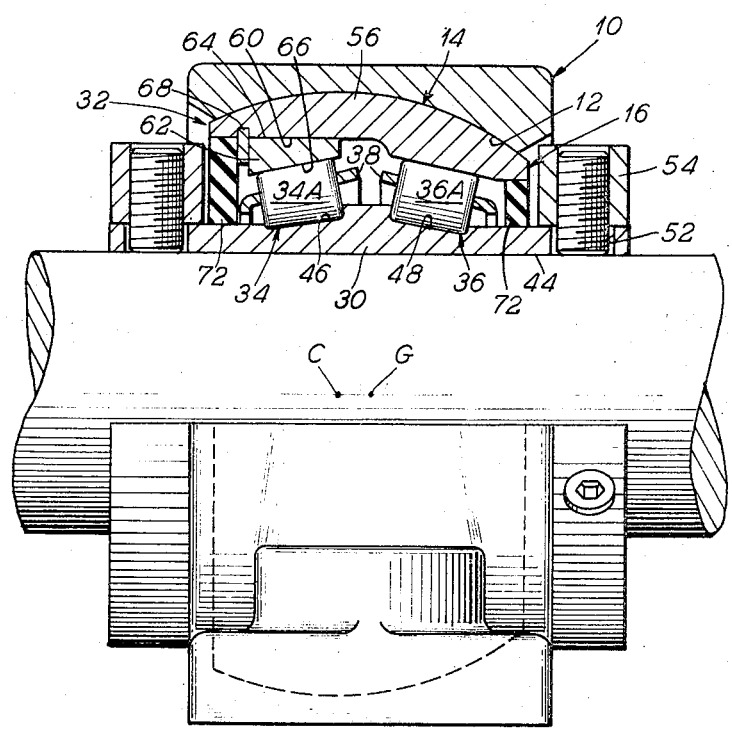
FIG. 3 is a sectional view similar to FIG. 2 and illustrating a modification of the bearing.

FIG. 3 illustrates a modification of the bearing of this invention. The primary difference between the bearing in FIGS. 2 and 3 is that the center C of the radius of the surface of revolution of the spherical outer surface 28 of the FIG. 3 embodiment is offset from the geometric center G of the bearing.

The "off center" feature permits a reduced size casting, with substantially uniform wall thickness and providing substantially uniform casting strength. Uniform walls permit uniform heat treatment and the structure, because of the uniformity of wall thicknesses, gives full load capacity under any misalignment. The bearing is such that it can be selectively positioned depending on the thrust load. The assembly is positioned so that extreme thrust loads are applied to the right side of the assembly, as viewed in FIG. 3. All other parts are the same as in the description of FIG. 2 and are identified with like reference characters, so that reference is made to the prior description for the description of the various parts. Here, locking collars 54 are illustrated at each end of the bearing.

Each bearing described is provided with a radial opening 74 counterbored at 76. Lubricant is introduced through the opening 74 and the counterbore 76. A pin 78 retained in the block fits into the counterbore 76 to position the bearing in the block. The pin 78 eliminates rotary motion of the outer race without interferring with the ability of the assembly to be self-aligning; it can be removed to re-lubricate the assembly.

While the invention has been described with respect to a pillow block casting, the structure of the bearing cartridge can be used equally as well in a flange block and the bearing while preferably is pre-assembled and preferably factory sealed, can be assembled on the site and sealed at that time, without departing from the spirit of the invention.

I claim:

1. A self-aligning bearing comprising a housing adapted to be fixed to a support having a cavity for receiving a roller bearing assembly, said cavity being defined by an inner spherical surface, said housing being provided with a lubrication fitting communicating with a passage into said cavity, said roller bearing assembly being insertable and removable as a unit with respect to said cavity and comprising:
   inner and outer race means;
   a pair of spaced groups of rollers between said inner and outer races
   said inner race means having spaced frusto-conical raceways for theoretical line contact with the rollers and a concentric cylindrical bore for receiving a shaft;
   said outer race means comprising,
   a. a first member having and defined within an outer spherical surface corresponding to the inner spherical surface of said block cavity, a frusto-conical raceway for theoretical line contact with one group of rollers and a cylindrical bore extending outwardly of said raceway and a lubricating passage to be aligned with the lubrication fitting and passage of said housing;
   b. a second and ring member having an outside cylindrical configuration corresponding to said bore in said first member and received therein, and an inner frusto-conical raceway for theoretical line contact with the rolls of the other group of rollers, pin means in said passages restricting rotation of said bearing assembly;
   and means for retaining the second member of said outer race in operational position with respect to said first member of said outer race,
   said roller bearing assembly being so movable with respect to said housing to accommodate limited shaft misalignment with respect to said support.

2. A roller bearing assembly as recited in claim 1 wherein said last named means is so constructed and arranged to permit controlled end-play and controlled preloading of the assembly.

3. A roller bearing assembly as recited in claim 1 wherein said outer race means is provided with a groove in said bore and wherein said retaining means comprises a split locking ring received in said groove.

4. A roller bearing assembly as recited in claim 1 wherein the radius of the generating arc of the spherical surface of said outer race means has a center at the geometric center of the bearing.

5. A roller bearing assembly as recited in claim 1 wherein the radius of the generating arc of the spherical surface of said outer race means has a center offset from the geometric center of the bearing.

6. A roller bearing assembly as recited in claim 1 further comprising means for introducing lubricant into said bearing.

7. A roller bearing assembly as recited in claim 1 further comprising means for preventing said outer race means from rotating in said housing.

* * * * *